(12) United States Patent
McMillan (10) Patent No.: US 8,703,033 B2
(45) Date of Patent: Apr. 22, 2014

(54) METHODS AND APPARATUS FOR FORMING A COMPOSITE COMPONENT

(75) Inventor: Alison J. McMillan, Uttoxeter (GB)

(73) Assignee: Rolls-Royce PLC, London (GB)

( * ) Notice: Subject to any disclaimer, the term of this patent is extended or adjusted under 35 U.S.C. 154(b) by 211 days.

(21) Appl. No.: 13/216,713

(22) Filed: Aug. 24, 2011

(65) Prior Publication Data
US 2012/0086152 A1 Apr. 12, 2012

(30) Foreign Application Priority Data

Oct. 7, 2010 (GB) .................................... 1016869.8

(51) Int. Cl.
*B29C 45/78* (2006.01)

(52) U.S. Cl.
USPC ..... 264/257; 264/259; 264/271.1; 264/328.1; 264/328.16; 264/328.9; 264/313; 264/334

(58) Field of Classification Search
USPC ........... 264/257, 313, 334, 259, 271.1, 328.1, 264/328.16, 328.9
See application file for complete search history.

(56) References Cited

U.S. PATENT DOCUMENTS

| 5,229,141 A * | 7/1993 | Mozer ........................... 264/257 |
| 5,817,269 A * | 10/1998 | Younie et al. ................. 264/258 |
| 2002/0125613 A1 * | 9/2002 | Cominsky ..................... 264/401 |

OTHER PUBLICATIONS

Search Report issued in British Application No. GB1016869.8 dated Jan. 27, 2011.

* cited by examiner

*Primary Examiner* — Matthew Daniels
*Assistant Examiner* — Saeed Huda
(74) *Attorney, Agent, or Firm* — Oliff PLC (57) ABSTRACT

A mold for a composite component having a fillet joint, the mold including a mold body having a cavity within which the component is formed, and an insert mating with the mold body and including a forming surface against which, in use, the fillet of the component fillet joint is formed. The insert may be thermally insulating and highly rigid. A method of forming a composite component having a fillet joint using a mold, the method including forcing a surface of the fillet region of the component to adopt a non constant radius of curvature while the component is inside the mold during the cure process is also provided. Additionally, a method of forming a composite component having a fillet joint that is defined between first and second legs the method including placing the legs of the component in bending during cure of the component is described.

13 Claims, 5 Drawing Sheets

METHODS AND APPARATUS FOR FORMING A COMPOSITE COMPONENT

The present invention relates to methods for forming a composite component having a fillet joint, including for example composite components having "T" or "L" joints. The present invention also relates to apparatus in the form of moulds for forming such components.

Organic matrix composite materials can offer significant advantages over metallic alternatives for component parts of a gas turbine engine, principally in reducing the overall weight of the engine. Many such components include joint regions in the form of a "T" or "L" having a fillet. An exemplary process for forming such components is described below, with reference to FIGS. 1 to 5.

Figure 1:
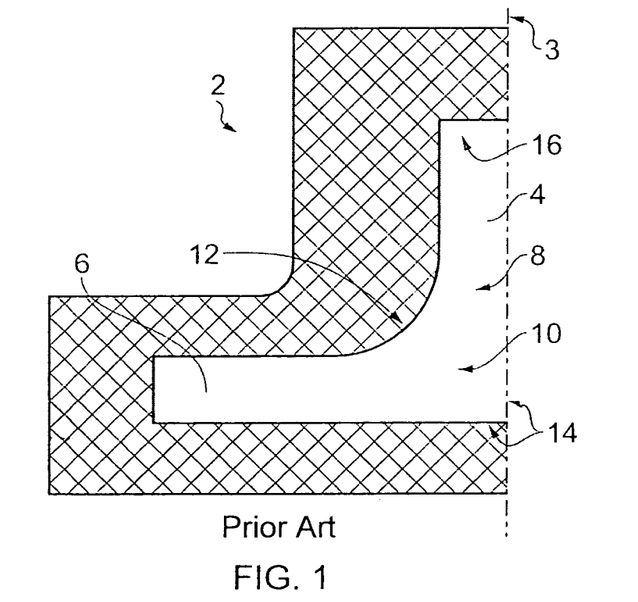
FIG. 1 is a part sectional illustration of a light weight mould tooling for a composite "T" joint.

FIG. 1 illustrates one half of a lightweight mould tooling 2 for a composite "T" joint. The second half of the mould tooling 2 is a mirror image along the axis 3. The tooling 2 defines first and second legs 4, 6, of the composite "T" joint component 8 as well as a fillet region 10 between the first and second legs 4, 6. The fillet region 10 extends from a fillet surface 12 to a base 14 of the fillet region 10. It will be appreciated that a further leg (not shown) is defined in the second mirror half of the tooling, and that the first leg 4 forms the stem of the "T", with the second leg 6 and final leg (not shown) forming a cross bar of the "T". It will also be appreciated that equivalent component regions are defined in a mould tooling forming an "L" shaped joint, the "L" mould tooling substantially resembling the half of the "T" mould tooling that is illustrated in FIG. 1. As is conventional, the lightweight mould tooling 2 follows the geometric outline of the component to be manufactured. Lightweight tooling is preferred to standard heavier, fully closed tooling, which is of much chunkier form, because it provides cost advantages, particularly in the formation of large components. However, lightweight tooling is subject to deformation under high internal pressures. In practice even the fully closed heavier tooling that is used for high precision parts will deform to a certain degree under very high internal pressures, but the problem is less pronounced than with the lightweight tooling illustrated.

In order to form the composite component 8, the mould tooling 2 is first disassembled and a fibre preform is introduced into the cavity 16 defined inside it. The mould tooling 2 is then reassembled around the fibre perform. Typically, the mould tooling 2 will be formed from several metallic parts that slide or bolt together to provide the finished shape, although this detail is not illustrated on the Figures.

Once the mould tooling 2 is assembled around the preform, resin is forced into the preform through one or more inlet pipes (not shown) leading through the mould tooling 2. One or more outlet pipes (also not shown) provide vacuum pressure to draw the resin through the fibre perform in the cavity 16. Careful choice of positioning of the inlet and outlet pipes ensures that the preform is fully impregnated with resin. Depending on the resin flow pattern within the preform, certain areas may be more susceptible to accumulation of trapped air pockets or other impurities. Choice of input and output positions and pressures can be used to manage this. In some cases, reactive pressure management can be used. Resin at this stage of the process, before cure, is highly viscous and the pressures required within the cavity 16 of the mould tooling 2 in order to ensure thorough wetting of the fibre preform are extremely high. At such pressures, the lightweight mould tooling 2 tends to deform, as illustrated in FIG. 2.

Figure 2:
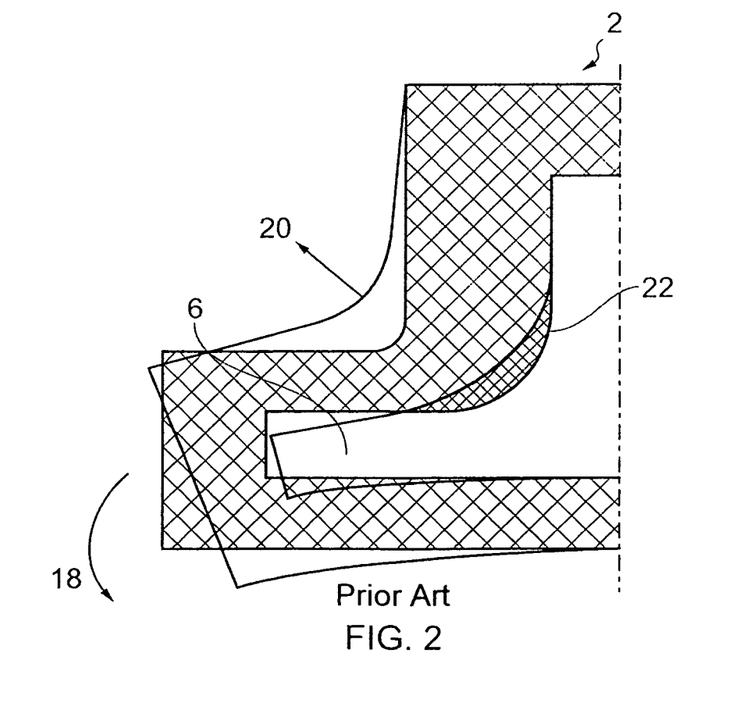
FIG. 2 is an illustration of the mould of FIG. 1 illustrating exaggerated typical deformation during resin impregnation.

FIG. 2 illustrates an exaggerated deformed shape of the mould tooling 2 during resin inflow. As the cavity 16 is subject to high pressure, it tends to deform to increase the internal volume, resulting in downward angling of the second leg 6 of the joint, indicated by arrow 18, and a pulling forward of the corner of the joint, illustrated at arrow 20. The downward angling of the second leg 6 appears severe, but in fact is relatively inconsequential and can be compensated for. The more serious issue is the pulling forward of the corner region, indicated at arrow 20. This change in the corner region increases the radius of curvature of the cavity 16 at the joint, and hence reduces fluid flow rate of the resin around this area, indicated at 22. Any trapped air pockets in this region will tend to stay trapped, and to increase in volume, leading to porosity in the finished component 8 at this critical joint region in the component. In addition, this deformation of the mould tooling 2 at the joint corner causes expansion of the adjacent region 22 of the component 8. Such expansion results in reduced pressure at the region 22, meaning any trapped gas voids will tend to gather in this region rather than being forced out of the component. This too leads to local porosity at this critical region of the joint.

After resin infusion, the composite component is cured under temperature and pressure control. Both temperature and pressure play a role in driving the cure process. The level of control used carries implications both for cost and for the practicalities of the process, but even for the most expensive controlled processes, there will be temperature and pressure variations through the component. This is in part owing to the nature of the composite material. Heat conductivity in the resin itself is low while heat conductivity in the fibres can be low (glass fibre), or moderate (carbon fibres), and depends on the local fibre directionality and proximity to the tooling wall. Heat conductivity in metallic tooling is high. The combination of these different conductivities means that the local temperature inside the component at any given time during the cure cycle will inevitably vary across the component. This variation means that different regions of the component will cure at different rates at different times within the cure processing. After processing, the level of cure in the cured resin will also be different across the component; meaning different regions of the component will have different resin properties.

Resin cure is an exothermic chemical process, releasing heat as the process progresses, and this heat gives a local rise in temperature in addition to the applied heat. Applied heat is typically achieved by heating the tooling, and thence by heat conduction into the component. Regions which are in close proximity to a metallic wall of tooling with start to heat up first, and will therefore begin to cure first, causing the component to cure from the outside inwards. Temperature and pressure drive the rate of cure and are managed as closely as possible by sensors in the tooling and by applied thermal or pressure gradients in the tooling.

Figure 3:
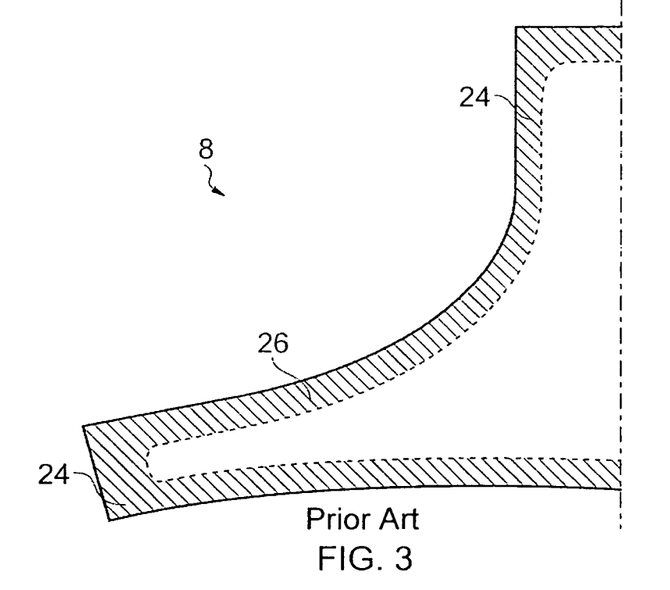
FIG. 3 is a representation of a component formed within the mould of FIG. 1, illustrating deformation of the component in the mould.

FIG. 3 illustrates the in-mould deformed shape of the component 8. The cross-hatched region 24 indicates the areas of the component 8 where the resin cures first, and the dashed line 26 is the "front" of the thermal gradient as the heat penetrates through the component 8. As the outside surface begins to cure before the inside, the outside is relatively rigid compared with the inside. So, when the outside takes on the deformed shape of the mould tool under pressure, the inside is constrained by this. Resin shrinks as it cures; meaning that as the inside cures its shrinkage generally pulls the outside surface, already rigid from having cured first, into compression. However, this propensity holds true only for convex shapes of isotropic material: for composites the differential stiffness and heat conductivity of the fibres will modify this behaviour.

Concave regions, such as internal curves in "T" joints can show significantly different residual stress effects, as discussed more fully below.

As the cure progresses, the inside of the composite component begins to heat by exothermic reaction causing its temperature to rise above that of the outside of the component 8. The rising temperature causes expansion (i.e. increased internal pressure), subjecting the mould tooling and already cured outside of the composite to tensile loads. As the resin cures and the mould tooling 2 eventually cools, there is a double shrinkage effect both from shrinkage caused by cure and shrinkage caused by cooling.

Figure 4:
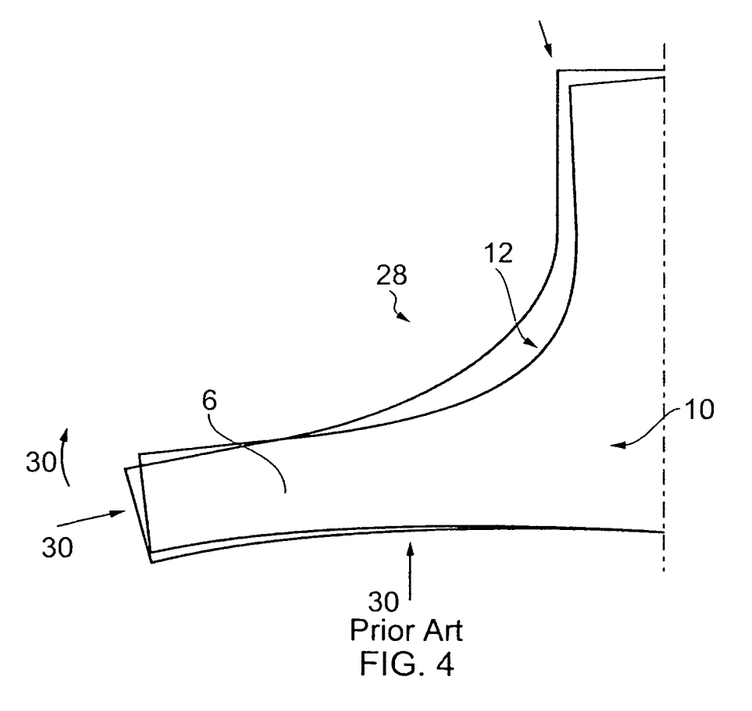
FIG. 4 illustrates typical distortion of a component on release from the mould of FIG. 1.
Figure 5:
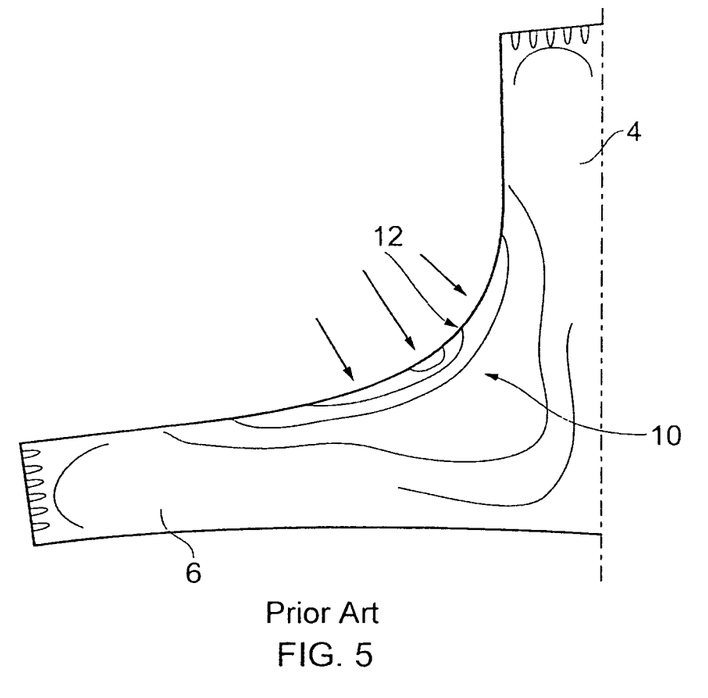
FIG. 5 is a representative illustration showing the residual stress state inside a component on release form the mould of FIG. 1.

After curing and cooling, the tooling is disassembled and the composite component is released from the mould. FIG. 4 shows typical distortions. The main shrinkage occurs inside the thickest part of the "T" joint. This pulls the fillet radius back inwards, indicated at arrow 28, and the leg 6 of the "T" lifts back up, indicated at arrows 30. The distortion of the leg 6 is easily compensated for by slight modification of the mould tooling 2. The most severe issue is the state of internal stress in the fillet region. Surface material being in a residual stress state of compression is generally a positive factor; forcing any cracks or voids to close. Conversely, if the surface stress state is in tension, any cracks or voids are allowed to open or expand and there is a tendency for these to propagate into the bulk of the component material. The inside of the component 8, because it has shrunk, is under tension. The base and the ends of the legs of the "T" are therefore under compression. However, the surface 12 of the fillet region has got longer not shorter during this shrinkage, the length around the whole joint angle increasing with the reduced radius of curvature. The result of this is that the external surface of the fillet region is under tension, as illustrated in FIG. 5.

As discussed above, tensile stresses on the surface of components are a serious weakness as any surface flaw will act as an initiation site for failure. With the inside region of the component 8 also under tension, any crack that starts in the fillet 12 will quickly propagate through the thickness of the component 8. Expansion and fluid flow patterns mean the fillet region 10 is a likely collection point for trapped air pockets or other impurities, as discussed more fully above. These voids and impurities form the basis of crack initiation sites, and the end result is that the manufacturing process described above must inevitably generate poor quality "T" joints unless very rigid tooling and process control is used. Even then, poor qualities around the critical fillet region may still be experienced.

It will be noted that the ends of sections of laminate are particularly prone to residual stress state effects which result from the thermal and stiffness conflicts between neighbouring plies. These are illustrated for example by the stress peaks shown at the ends of the legs 4, 6 of the joint in FIG. 5. These stresses lead to a propensity for component delamination initiating from the ends. In extreme cases, they can lead to the component delaminating spontaneously on release from the mould tooling. To reduce the effect, it is known to match stiffness between plies as carefully as possible (e.g. a 45° ply may be laid on top of a 0° ply, but not a 90° on top of a 0° ply.)

From the foregoing discussion to can be seen that existing manufacturing procedures for composite "T" and "L" joints suffer from excessive cost requirements, even to produce parts that are merely acceptable. Even with the good process control that is achieved at this high cost, the parts are naturally predisposed to have poor properties in the fillet region that is most important to the strength of the entire component. These poor properties arise from porosity in the fillet region and undesirable residual stresses generated in this region during the cure process. Given the problems with manufacture of such components, these parts tend to be over weight in order to achieve the strengths required. If they are part of components such as stator aerofoil to platform joints, then large over generous fillets additionally lead to aerodynamic losses.

SUMMARY OF INVENTION

According to the present invention, there is provided a method of forming a composite component having a fillet joint, characterised in that the method comprising thermally insulating the fillet region of the component during cure, such that the fillet region is substantially the last region of the component to cure. In this manner, undesirable tensile residual stresses in the surface area of the fillet region can be significantly reduced.

An insert may be used which is additionally or alternatively geometrically stable under conditions in which the component is formed. The insert may thus provide rigidity to the mould at the fillet region, where deformation of the mould is most damaging to the eventual properties of the component to be formed.

Preferably thermally insulating the fillet region comprises insulating a surface of the fillet from the source of heat that drives the cure process. The source of heat may comprises a heated mould an insert may be placed between a surface of the fillet of the component and a surface of a heated mould within which the component is formed.

The method may further comprise assembling a component fibre preform, introducing the preform into a mould, impregnating the preform with resin, and heating the mould to drive the cure process. By physically reinforcing the mould at the fillet region, deformation of the mould at this region is reduced, improving resin flow patterns and reducing local component expansion.

Reinforcing may comprise inserting an insert into the region of the mould against which the fillet region of the component is formed.

The method of forming a composite component may also comprise forcing a surface of the fillet region of the component to adopt a non constant radius of curvature while the component is inside the mould during the cure process. The non constant radius of curvature may have the effect of lengthening the arc of the component surface at the fillet radius, enabling it to be "stretched out" following component cure, cooling and associated deformation without inducing excessive tensile stresses in the fillet surface.

Forcing the fillet region to adopt a non constant radius of curvature may comprise forming the fillet region against a forming surface of the mould that has a non constant radius of curvature.

The method may further comprise releasing the component from the mould and allowing the fillet region to adopt a radius of curvature determined by residual stresses in the component.

The surface of the fillet region may for example be forced to adopt an elliptical or quartic curve, or some blending of the two. The curves may comprise additional small undulations.

The method may also comprise forming a composite component having a fillet joint that is defined between first and second legs, the method comprising placing the legs of the component in bending during cure of the component. Such bending may assist in control of mould deformation and may also assist in establishing useful residual stress patterns.

Placing the legs in bending may comprise bending the legs towards each other, such that the angle of the fillet joint is reduced.

Placing the legs in bending may comprise imparting bending forces to the legs via a mould in which the component is formed.

The bending forces may be imparted by mechanical actuators, which may for example be built into the mould.

The bending forces may be imparted by differential thermal expansion of different parts of the mould. The differential expansion may be caused by a bimetallic effect.

There may also be provided a method of forming a composite component having a fillet joint that is defined between first and second legs, the method comprising reducing the thickness of the component at the fillet region, such that the cross section of the component is substantially uniform across the first and second legs and the fillet region of the component. A more uniform cross section may achieve reduced component shrinkage and more even resin flow during resin impregnation.

The reduction in thickness may be achieved by a protrusion on a mould within which the component is formed. The reduction in thickness may be achieved by introducing an insert into a mould in which the component is formed.

The present invention, in its various aspects, provides a range of methods and apparatus for the forming of a composite component having a fillet joint. Each of the various aspects addresses the poor properties in the fillet region experienced with conventional manufacturing processes and equipment. It will be appreciated that any of the various aspects may be used in combination with any other aspect to beneficial effect. For example, a mould of the present invention may comprise an insert having some or all of the properties described, as well as mechanical actuators to place legs of the joint in bending. Many other beneficial combinations of aspects of the invention are possible, as will be appreciated from the following detailed description.

BRIEF DESCRIPTION OF THE DRAWINGS

For a better understanding of the present invention, and to show more clearly how it may be carried into effect, reference will now be made, by way of example, to the following drawings, in which:—

DETAILED DESCRIPTION OF EMBODIMENTS

As discussed above, the various aspects of the present invention, both method and apparatus, may be employed singly or in combination to beneficial effect. The following detailed description discloses two exemplary embodiments of mould tooling, each of which embody some combination of the inventive aspects disclosed above. It will be appreciated that alternative combinations of inventive aspects may be considered. Particularly as regards the methods of forming components disclosed and claimed in the present specification, it will be appreciated that the moulds described in detail below represent merely one exemplary manner in which the methods may practically be employed.

Figure 6:
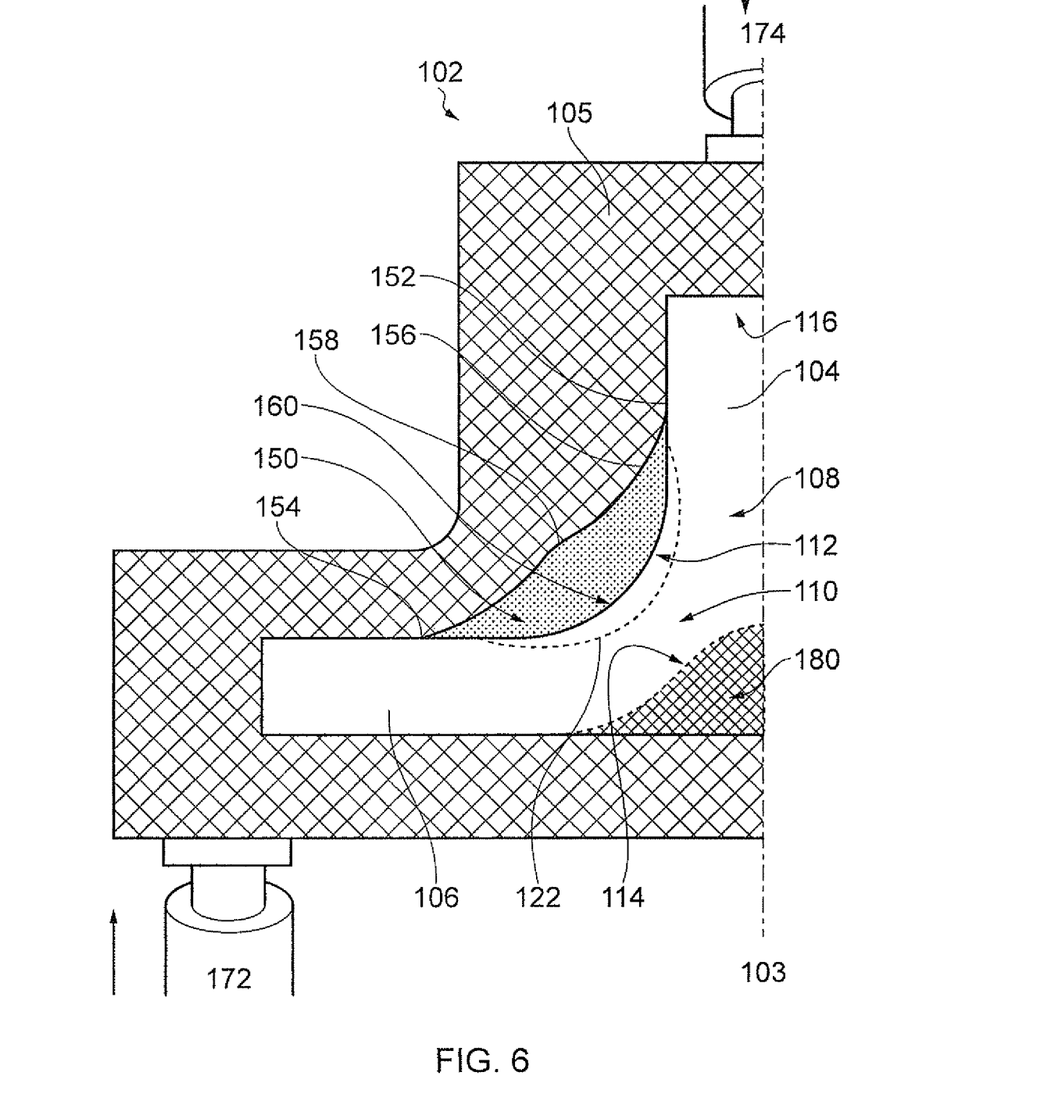
FIG. 6 is an illustration of a mould embodying aspects of the present invention.

With reference to FIG. 6, a mould tooling 102 for a composite "T" joint component 108 comprises a mould body 105 having a mould cavity 116 formed therein. The mould tooling 102 is illustrated in part section, showing only one half of the tooling. It will be appreciated that the other half of the mould tooling 102 is a mirror image along the axis 103. The mould tooling 102 defines first and second legs 104, 106, of the composite "T" joint component 108 as well as a fillet region 110 between the first and second legs 104, 106. The fillet region 110 of the component extends from an arcuate fillet surface 112 to a base 114 of the fillet region 110. It will be appreciated that equivalent component regions are defined in a mould tooling forming an "L" shaped joint also. An insert 150 mates with the mould body 105 at the fillet region of the mould tooling 102.

The insert 150 is formed from a thermally insulating material. The effect of this is to prevent heat energy from the heated mould body 105 from reaching the fillet region 110 of the component via direct conduction. By insulating the fillet region 110 from direct heating by the mould body 105, the insert 150 prevents the early cure and cool of the fillet region that is so damaging to the component in creating tensile stresses at the fillet surface. The insert 150 ensures that the fillet region 110 is substantially the last region of the component 108 to cure, as heat energy to drive the cure process must travel through the rest of the component 108 to reach the fillet region 110. The thermal "front" thus approaches the fillet surface 112 of the component 108 from either side and from the direction of the through thickness of the fillet joint itself. With the fillet region insulated from the applied heat energy, the bulk of the component, and the through thickness of the fillet region cures, and hence shrinks, before the surface area of the fillet region (identified at 122) has hardened. Thus, as the through thickness of the fillet region shrinks on cure, the outer region 122 can deform with the shrinkage, without generating stresses within the, as yet uncured, resin of the outer region 122. As the through thickness is not constrained by a hardened outer region, the shrinkage of the through thickness of the fillet region also does not place the through thickness of the fillet region 110 into tension. By the time the resin in the critical surface area 122 is curing, the remainder of the component has substantially cured and thus only thermal shrinkage effects will be experienced in this region post cure. The result of this thermal insulation, and the consequent change in order in which the component regions cure, is that the final residual stresses in the entire fillet region 110, including the surface region 122, are those due to the spring-back of the rest of the component on release from the mould. These stresses are easier to predict and manage, and other tooling design manipulations can ensure that the resulting residual stress state in the fillet area is compressive (i.e. beneficial in suppressing fatigue crack propagation at the fillet area).

The material of the insert 150 is also highly rigid and is geometrically stable at temperatures and pressures employed during composite component cure. It is an advantage that the thermally insulating materials appropriate for providing the insulating properties of the insert discussed above also tend to have the desired rigidity. Ceramics are an exemplary class of materials displaying the necessary properties. The highly rigid insert 150 helps to impart geometrical stability to the mould tooling 102 at the critical fillet region, preventing the bulging effect in the fillet area illustrated in FIG. 2. By preventing this bulging, associated problems with resin flow during impregnation, as well as local pressure changes, can be avoided. This reduces the incidence of local porosity that leads to crack initiation and associated poor strength in this critical region. By managing deformation of the mould tooling 102 in this region, the insert 150 enables lightweight mould tooling to be used in a greater range of high precision applications, avoiding the excessive cost associated with heavier tooling.

The insert 150, viewed in cross section as in FIG. 6, tapers towards first and second edges 152, 154, which may be longitudinal edges extending into and out of the plane of the Figure. The ends 152, 154 of the insert thus lie approximately tangentially to the legs of the "T" just beyond the extent of the fillet curvature. The tapered edges ensure a smoothly varying applied heat profile over the exposed length of the legs of the joint. Non tapered edges to the insert 150 can be envisaged but are less desirable for two reasons. Firstly a step change from insert 150 to mould body 105 would create an abrupt change of temperature gradient which would have an adverse effect on the composite material characteristics in that region. Secondly, the relative thermal expansion of the metal mould body 105 and the insulating insert 150 would be difficult to manage. A gap would likely form, leading to material property issues on the surface of the composite component 108.

The insert 150 contacts the mould body 105 at a mating interface 156. A protrusion 158 is formed on the mating surface of the insert 150 and is received in a corresponding recess in the mating surface of the mould body 105. The cooperating protrusion and recess provide a location feature for assembly of the insert 150 in the mould body 105 and also help to prevent slippage of the insert during processing. The cooperating protrusion 158 and recess are formed at the very centre of the fillet region of the mould. In this manner, the centre of the fillet, which is the location most at risk from detrimental tensile stress, is provided with additional thermal insulation, and is protected from cure until the very end of the cycle.

The insert 150 comprises a forming surface 160, against which the fillet of the component 108 is formed. The forming surface 160 of the insert 150 traces a curve between the first and second ends 152, 154 of the insert. The curve of the forming surface is non circular, the radius of curvature of the curved surface varying across the surface. In the embodiment of FIG. 6, the curved forming surface 160 of the insert 150 traces the following path (from left to right across the fillet): initially, the curve rises a little earlier than a circular arc would rise, the curve then flattens out and passes across the imaginary line of the circular arc, by the halfway mark around the fillet (45° around), the fillet has gone a little deeper into the material than a circular arc would. The rest of the path is a mirror image about the 45° line.

It will be appreciated that the curve illustrated in FIG. 6 and described above is merely an example. The curve may follow an elliptical path: $(x/a)^2+(y/b)^2=1$, a quartic path e.g. $x^4+y^4=R^4$, or $(x/c)^4+(y/d)^4=1$, or various combinations of these (e.g. $[(x/a)^2+(y/b)^2=1]*[(x/c)^4+(y/d)^4-1]* \ldots * [(x/p)^{2n}+(y/q)^{2n}-1]=0$.

The curve function need not be symmetrical about the 45° line but it is desirable for the curve to be smooth, in order to avoid step changes and their attendant disadvantages, as discussed above. The curve may also include small undulations in additional to the principal curve function.

By varying the geometry of the forming surface 160 of the insert 150, and hence of the fillet surface on the component, fine control of the fillet arc length, and thus the levels of residual stress in the fillet, can be achieved. Undulations and other variations from a pure circular arc give rise to a slightly longer fillet arc length than would be provided were the radius of curvature constant and the arc a perfect circular arc. These undulations can be stretched out to form a circular arc that extends around the reduced radius of curvature after the component is released from the mould. Thus the inevitable lengthening of the arc that follows spring back of the joint legs, and the attendant reduction in joint angle, can be accommodated merely by smoothing out the undulations without inducing tensile stresses in the surface material. A quartic or elliptoquartic shape would also give a generally greater arc length and so has the property of maintaining a smaller aerodynamic blockage if the "T" joint is to be used at the base of a stator aerofoil attached to a platform in an aero engine.

It will be appreciated that many of the advantages provided by the insert 150 of the present embodiment may be achieved through alternative means. For example, thermal insulation at the fillet region, geometric reinforcement and a non circular radius of curvature may each be achieved through a modified mould body. The embodiment described represents one exemplary and inventive manner in which these improvements to the established process may be implemented.

FIG. 6 includes a schematic representation of mechanical actuators 172, 174 mounted at the ends of each of the legs of the "T" joint. The actuators may be external, such as a loading rig within which the mould tooling 102 may be mounted, or the actuators 172, 174 may be built into the mould tooling 102, attached to upper and lower surfaces in locations chosen for convenience and best effect. The effect of the mechanical actuators 172, 174 is to place the legs of the "T" joint into bending during cure. The direction of the applied force from the actuators may be either push or pull, or both, and may be applied at particular stages during the cure cycle. Particular alternatives include for example a "4 point bend" type arrangement, such as is used for testing the strength of beams or "T" pieces. In the case of a casing flange "L" joint, then the loading may be applied across both legs of the joint, urging the legs toward each other.

Placing the legs of the joint into bending helps to control the deformation of the mould tool 102 during resin inflow, and particularly helps to avoid the bulging effect seen at the fillet region in FIG. 2. This helps to improve resin flow around the fillet region and hence reduce porosity. Placing the legs in bending during cure can also counteract undesirable bending effects caused by the different rates of cure throughout the component, and can be used to establish useful residual stress patterns.

An alternative embodiment of the invention (not shown) places the legs of the joint in bending by generating a bimetallic effect in the mould tooling. Multiple different metals, having differing thermal expansion properties, may be employed within the tooling to cause controlled deformation of the tooling under increased temperature. Such bending is less easy to control directly than the mechanically applied loads, but generally applies a more even stress state. Some control of bending levels can be achieved through local temperature control within the mould tooling.

With reference again to FIG. 6, the mould tooling 102 further comprises a second insert 180, located substantially at the base of the "T" of the joint. The insert 180 may be added to the mould body 105 before the fibre preform is introduced, or the fibre preform may be placed on top of the insert 180. As with the previously described fillet insert 150, the second insert 180 tapers towards opposed edges and comprises a location feature (not shown) to assist placement of the insert 180 and to avoid slippage during cure. Alternatively, the insert 180 may be replaced by an integrally formed protrusion on the mould body 105, having the same shape and location as the insert 180.

The insert 180 ensures the provision of a "T" or "L" joint component 108 having a modified base. This provides a small weight reduction in the component 108 and also reduces stress transmission between the central leg of the "T" and the side legs. This may be particularly useful if the "T" represents a platform mounted stator aerofoil, as this would reduce the vibration stresses through the region and improve fatigue life. More importantly, the reduced composite thickness at the joint region means that thermal and resin shrinkage strains are reduced and have less impact on the embedded residual stresses in the component when it is released from the mould. Additionally, as the preform cross section is much more uniform, the resin injection flow profile is more even, reducing porosity in the fillet region. Finally, the residual stresses in this region can be controlled in a similar way to the fillet area using insulation and thermal gradients.

In the case of a symmetric "T" joint, the arch of the base, and hence the top arch of the insert 180, should be flat so that the geometry is smooth. If the "T" is asymmetric, the condition of flatness is may not be required, but the importance of smooth geometry remains, as otherwise there would be a propensity for the joint component 108 to split up the centre. In view of the curve imparted to the component surface by the insert 180, it may also be desirable for the insert 180 to be of low thermal conductivity, as discussed in detail with respect to the fillet insert 150.

Figure 7:
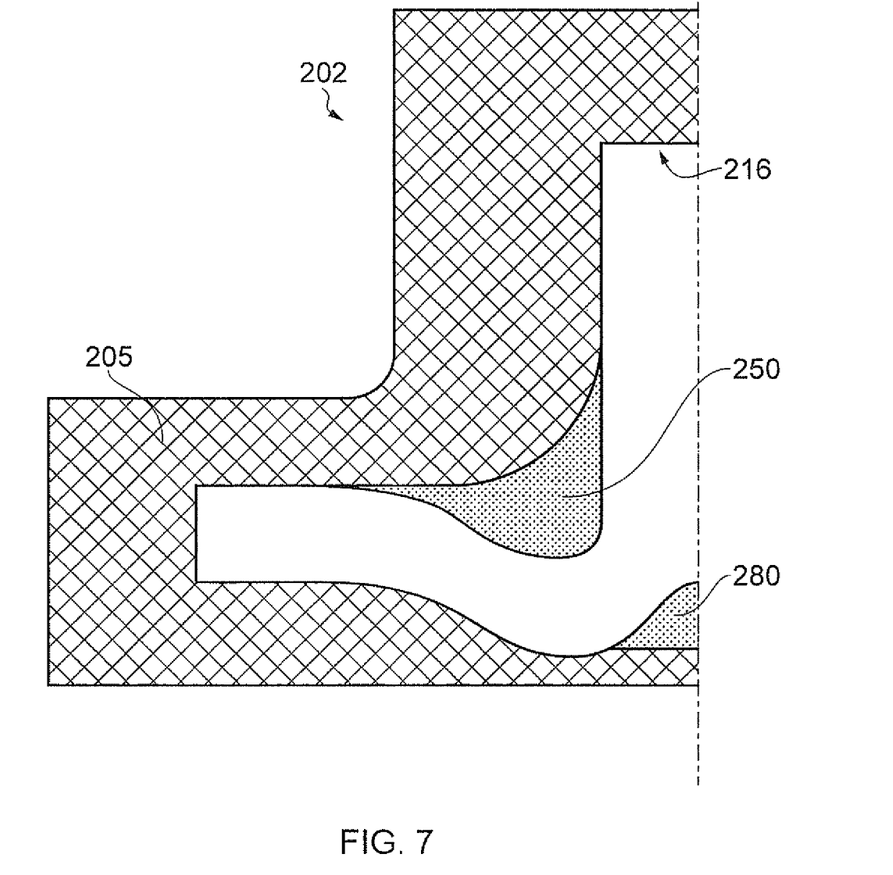
FIG. 7 is an illustration of another mould embodying aspects of the present invention.

FIG. 7 illustrates a more extreme variation of this concept. The mould tooling 202 of FIG. 7 comprises a mould body 205, cavity 212 and fillet and base inserts 250, 280. Both inserts 250, 280 are thermally insulating. The fillet insert 250 of the mould tooling 202 has the effect of extending the fillet of the joint under the base. Such an arrangement would enable the provision for example of a stator vane which is completely un-compromised by fillet region blocking. (The fillet dent may be filled with a lightweight filler material, if necessary). The shape of the component 208 formed in the mould tooling 202 is inherently flexible, thus providing good fatigue life. The geometry also has the advantage of following the line of the preform without significant thickness variations, which means that it can be created using simple plies without needing a deltoid filler.

In some cases, removing the flat base may not be possible, for example where a flat base is a necessary feature. In such cases the flat base may reinstated after cure of the component by building back the base in filler material after manufacture.

As previously discussed, some or all of the concepts described above may be used in combination. Alone or in combination, each of the various aspects of the present invention addresses the issue of poor strength in the critical region of the fillet in composite components having a fillet joint. These poor properties are addressed by:

1) Reducing porosity in the critical load region of the fillet area though improving resin flow paths and reducing pressure changes in the critical region during cure; and/or
2) Suppressing harmful residual stresses, which may include replacing those harmful residual stresses with beneficial ones.

"T" and "L" joints with which the present invention may be beneficially employed can be found in various joints and brackets used for attaching components together. "T" shaped joints may for example be found in the design of platform mounted stator aerofoils in an aero engine. The present invention may also find application in casing flanges, formed as a solid revolution of an "L" shape. The invention may assist in maintaining flange roundness and controlling swash, as well as managing residual stresses.

The invention claimed is:

1. A method of forming a composite component having a fillet joint, wherein the method comprises providing a thermally insulating element between a surface of the fillet joint and a surface of a heated mould within which the component is formed in order to thermally insulate a fillet region of the component during cure, such that the fillet region is substantially the last region of the component to cure, the thermally insulating element being rigid so as to be geometrically stable at temperatures and pressures employed during component cure.

2. A method as claimed in claim 1, wherein the thermally insulating element is a rigid insert.

3. A method as claimed in claim 1, wherein the thermally insulating element is provided by a modified portion of the mould body.

4. A method as claimed in claim 1, wherein the method further comprises assembling a component fibre preform, introducing the preform into a mould, impregnating the preform with resin, and heating the mould to drive the cure process.

5. A method as claimed in claim 1, the method further comprising forcing a surface of the fillet region of the component to adopt a non constant radius of curvature while the component is inside the mould during the cure process.

6. A method as claimed in claim 5, wherein forcing the fillet region to adopt a non constant radius of curvature comprises fanning the fillet region against a forming surface of the mould that has a non constant radius of curvature.

7. A method as claimed in claim 5, further comprising releasing the component from the mould and allowing the fillet region to adopt a radius of curvature determined by residual stresses in the component.

8. A method as claimed in claim 4, wherein the method further comprises forming the composite component between first and second legs, the method comprising placing the legs of the component in bending during cure of the component.

9. A method as claimed in claim 8, wherein placing the legs in bending comprises bending the legs towards each other, such that the angle of the fillet joint is reduced.

10. A method as claimed in claim 8, wherein placing the legs in bending comprises imparting bending forces to the legs via a mould in which the component is formed, the bending forces being imparted by either mechanical actuators or by thermal expansion of different parts of the mould.

11. A method as claimed in claim 1, wherein the method further comprises reducing the thickness of the component at the fillet region, such that the cross section of the component is substantially uniform across the first and second legs and the fillet region of the component.

12. A method as claimed in claim 11, wherein the reduction in thickness is achieved by either a protrusion on the mould within which the component is formed or by introducing an insert into the mould in which the component is formed.

13. A method as claimed in claim 3, wherein the modified portion of the mould body provides geometric reinforcement.

* * * * *